United States Patent
Casey et al.

[11] Patent Number: 6,163,541
[45] Date of Patent: Dec. 19, 2000

[54] METHOD FOR SELECTING VIRTUAL CHANNELS BASED ON ADDRESS PRIORITY IN AN ASYNCHRONOUS TRANSFER MODE DEVICE

[75] Inventors: Donal Casey; Anne O'Connell, both of Dublin, Ireland; Dipak M. L. Soni, London; Peter A. Saunderson, Berkhamsted, both of United Kingdom

[73] Assignee: 3Com Technologies, Georgetown, Cayman Islands

[21] Appl. No.: 09/007,801

[22] Filed: Jan. 15, 1998

[30] Foreign Application Priority Data

Jan. 17, 1997 [GB] United Kingdom .................... 9701017

[51] Int. Cl.[7] .................................................. H04L 12/56
[52] U.S. Cl. .................................................. 370/395
[58] Field of Search ..................... 370/395, 396, 370/397, 399, 389, 351, 352, 411, 412, 462, 445, 401, 465, 466

[56] References Cited

U.S. PATENT DOCUMENTS

| | | |
|---|---|---|
| 5,282,207 | 1/1994 | Jurkevich et al. . |
| 5,570,348 | 10/1996 | Holden . |
| 5,579,312 | 11/1996 | Regache . |
| 5,581,552 | 12/1996 | Civanlar et al. . |
| 5,583,861 | 12/1996 | Holden . |
| 5,732,071 | 3/1998 | Saito et al. . |
| 5,752,003 | 5/1998 | Hart . |
| 5,774,662 | 6/1998 | Sakagawa . |
| 5,841,771 | 11/1998 | Irwin et al. ............................. 370/360 |
| 5,878,043 | 3/1999 | Casey . |
| 5,884,297 | 3/1999 | Noven .................................... 370/395 |
| 5,930,259 | 7/1999 | Katsube et al. . |

FOREIGN PATENT DOCUMENTS

| | | |
|---|---|---|
| 0706298 A2 | 4/1996 | European Pat. Off. . |
| 0691772 A2 | 10/1996 | European Pat. Off. . |
| 0731582 A2 | 11/1996 | European Pat. Off. . |
| 0797331 A2 | 9/1997 | European Pat. Off. . |
| 2043405 | 10/1980 | United Kingdom . |
| 2292292 | 2/1996 | United Kingdom . |
| WO 97/43869 | 11/1997 | WIPO . |

*Primary Examiner*—Dang Ton
*Attorney, Agent, or Firm*—Nixon & Vanderhye P.C.

[57] ABSTRACT

An address look-up data-base is used to store medial access control addresses for resolution into channel numbers in a system for transmitting data in an asynchronous transfer mode. Static random access memory is used to contain pointer tables, there being a pointer table for each possible priority level in the data packet. Thus a search for the media access control address of a data packet in the content addressable memory yields, among other data, a priority value which when combined with other data points to a location in one of the pointer tables, which accesses the appropriate channel number.

6 Claims, 4 Drawing Sheets

METHOD FOR SELECTING VIRTUAL CHANNELS BASED ON ADDRESS PRIORITY IN AN ASYNCHRONOUS TRANSFER MODE DEVICE

CROSS-REFERENCES TO RELATED APPLICATIONS

This application relates to subject matter related to the subject matter of the following co-pending applications all of which have a common assignee:
METHOD OF SUPPORTING UNKNOWN ADDRESSES IN AN ASYNCHRONOUS TRANSFER MODE INTERFACE—O'Connell et al.—Ser. No. 09/007,800 filed of even date herewith.
METHOD FOR DISTRIBUTING AND RECOVERING BUFFER MEMORIES IN AN ASYNCHRONOUS TRANSFER MODE EDGE DEVICE—O'Neill et al.—Ser. No. 09/007,803 filed of even date herewith.
METHOD FOR ALLOCATING NON-BUS CHANNELS FOR MULTI-MEDIA TRAFFIC IN ASYNCHRONOUS TRANSFER MODE—O'Connell et al.—Ser. No. 09/007,519 filed of even date herewith.
METHOD OF BUFFER MANAGEMENT IN VIRTUAL CIRCUIT SYSTEMS—Creedon et al.—Ser. No. 09/007,832 filed of even date herewith.

BACKGROUND OF THE INVENTION

This invention relates to data communication systems and particularly to an interface between a data bus, which may be connected to or from part of a local area network, and a system which operates in an asynchronous transfer mode, which conveys data in virtual channels according to a protocol which allows a multiplicity of different messages to be transmitted in a time-shared manner, the messages being in the form of addressed packets composed of cells, there being no regular or prescribed spacing between the cells.

INTRODUCTION

Although communication systems usually known as local area networks have reached considerable sophistication, they are known to have various short-comings which prevent their use as the number of users increase. The development of asynchronous data transfer promises to be a versatile and convenient solution to the difficulties of providing a large scale communication network which enables concurrent use by a multiplicity of users. At the present time there are a large number of local area networks in use and, notwithstanding their limitations, they are convenient for small organisations or local data transfer, and it is expected that they will remain the preferred form of systems within a single organisation for many years to come. There is therefore a need for an interface which, among other facilities, enables data which is provided by a local area network, for example an Ethernet or token-ring network to be converted to a form suitable for transmission in an asynchronous transfer mode.

Data may be prepared for transmission in asynchronous transfer mode by means of a segmentation and reassembly memory (SAR), such as that described in 'TDC 1570 Specification rev. 2.36' (Texas Instruments), under the control of a programmed data processor, and requires substantial random-access memory, organised as a multiplicity of addressable buffers, which store data packets before and during their transmission on the virtual channels made available by the SAR.

SUMMARY OF THE INVENTION

In order to facilitate the establishment of a virtual channel for the transmission of data to its appropriate destination, it is convenient for an interface to include a an address look-up data-base, which may be a content addressable memory, which is a memory adapted for the rapid search of stored data. The data-base is used to store an address, such as an ethernet address or a suitably adapted form of a token ring address. Such an address is termed herein a media access control Address. Associated with each media access control address in the content addressable memory is related data. When a data packet is received, a search is made for its destination address, i.e. its media access control address, in the data-base and the related data is returned, i.e. made available if the search is successful. The related data should enable the data to be directed to a specific channel in the asynchronous transfer mode network, it being necessary to map a media access control address to an asynchronous transfer mode channel number such that when a packet is received with that media access control address, the channel number is used to forward the packet to the correct virtual channel in the asynchronous transfer mode network. It should be mentioned that if the media access control address is not stored in the data-base, then, except for some special cases with which the present invention is not concerned, the address is still entered in the data-base and marked to indicate that a search (called address resolution protocol) is being made, normally by means of a broadcast transmission to a multiplicity of destinations, to locate on the receipt of a suitable response, the actual destination.

The programming of a data-base such as a content addressable memory is difficult and thus it is not easy to change the data which is stored; in practice a content addressable memory chip is comparatively expensive.

In an asynchronous transfer mode network, virtual channels can be allotted a high or low priority or in general different priorities. Further, a data packet can normally contain a priority bit or multi-bit field and thus packets of different priorities in general need to be sent over the asynchronous transfer mode network on different channels.

This invention uses an address look-up data-base such as a content addressable memory to store media access control addresses and static random access memory to contain pointer tables, there being a pointer table for each possible priority level in the data packet. Thus a search for the media access control address of a data packet in the content addressable memory yields, among other data, a value which either alone or combined with other data such as the priority of a packet, provides a priority value which points to a location in one of the pointer tables, which accesses the appropriate channel number.

It is possible to configure such a system to use the same virtual channel for different priorities or to use different virtual channels for different priorities. Further, although the specific example described later employs only two priority levels (defined by a single priority bit), expansion to more than two levels and a corresponding number of pointer tables is feasible, thereby further expanding the 'width' of the data-base, i.e. the content addressable memory. The invention allows a more efficient use of the content addressable memory, by reducing the required space to 1/n where n is the number of priority levels and exploits the static random access memory to substitute for the more expensive content addressable memory.

Other features of the invention will be apparent from the detailed description which follows by way of example of the invention.

DESCRIPTION OF THE PREFERRED EMBODIMENT

Figure 1:
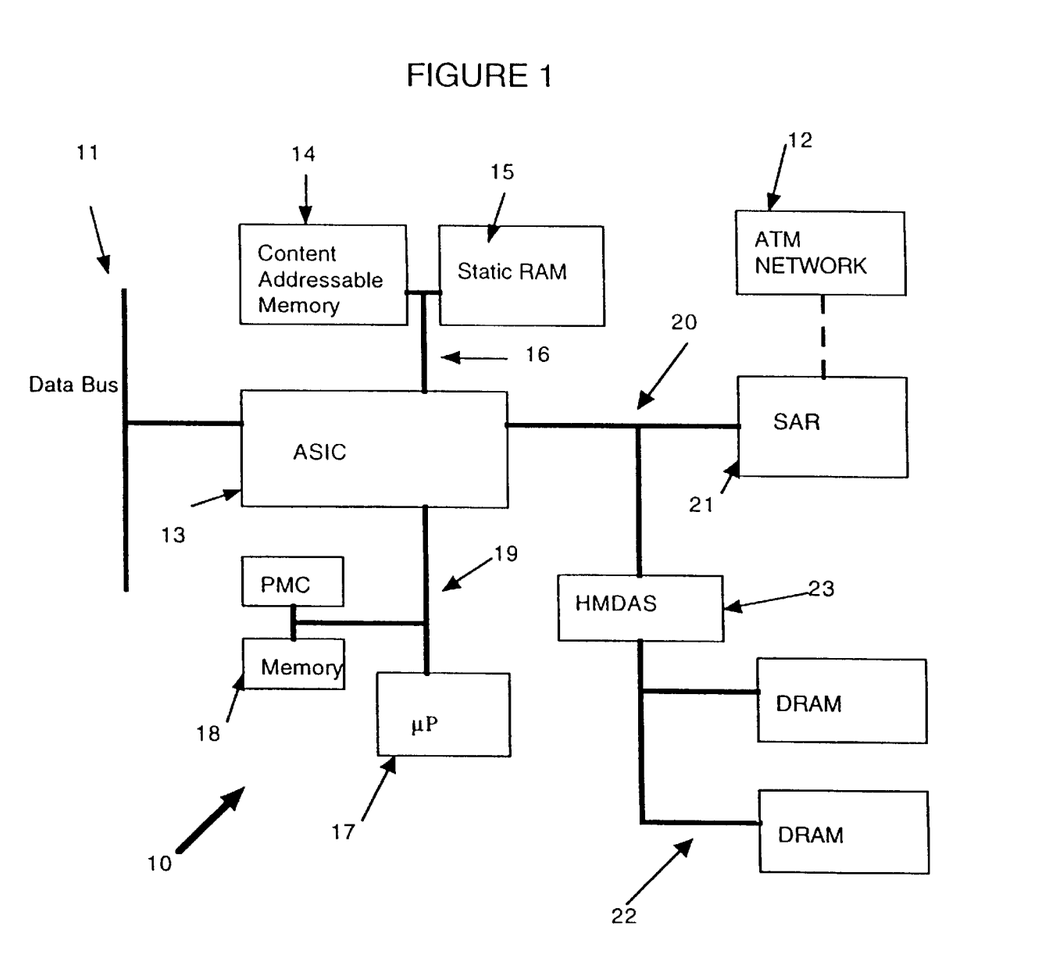
FIG. 1 illustrates in schematic form an apparatus in which the present invention may be performed.

FIG. 1 illustrates schematically the important function elements of an apparatus 10, conventionally termed a 'down-link interface' which provides a connection and signal processing between a data bus 11 and virtual communication channels in a system 12 operated in an asynchronous transfer mode. Connected to the data bus 11 is an ASIC, i.e. an Application Specific Integrated Circuit 13 of which the manner of operation is not directly relevant to the present invention but which will be broadly described in order to provide the context within which the present invention may be more easily understood.

The main components of the apparatus 10 comprise, in addition to the ASIC 13, a content-addressable memory 14, a static random-access memory 15, an internal data bus 16 connecting the memories 14 and 15 to the ASIC 13, a microprocessor 17 and an associated memory 18, both connected to the ASIC 13 by means of an internal data bus 19, an internal data bus 20, a segmentation and reassembly system 21 connected to the ASIC 13, a large-capacity dynamic random-access memory 22 and a memory data address switch 23 which provides an interface between the bus 20 and the memory 22. Typically the memory 22 contains at least two mega-bytes of memory space (and optionally substantially more).

The purpose of the content-addressable memory 14, the operation of which will be described in more detail later, is to provide look-ups which will translate, or map, an address contained in a data packet received by way of the bus 11 into a number identifying the virtual channel on which the cells of that packet will be transmitted in asynchronous transfer mode.

The ASIC 13 provides a variety of data paths for data packets and in particular will enable data packets arriving on the data bus 11 to be processed as necessary as transferred to the asynchronous transfer mode. Likewise it will provide a converse path for data arriving on virtual channels to be processed as necessary and transmitted on the bus 11. It provides the necessary bidirectional connections between the central processing unit and the asynchronous transfer mode and it will support, as explained later, sixteen work groups and, using a priority bit per work group, thirty-two 'emulated' local area networks. The ASIC 13 controls access to the memory 22. There is a variety of primary and secondary control functions which the ASIC 13 will provide but which are not directly relevant to the invention.

Brief Functional View

The present invention will be described by way of a specific example w herein an asynchronous transfer mode network emulates a multiplicity of local area networks. This emulation is desirable for the following reasons.

Much existing data transmission currently arises from the use of local-area networks, which be of two main types, collision-detection multiple access (e.g. Ethernet) or token ring. These networks differ from asynchronous transfer mode in that the messages are connectionless, broadcast messages (i.e. messages to all members of a local area network) are easily accomplished and destination addresses, usually called medium access control address addresses, are independent of the topology of the network.

There is currently a vast base of existing software that is particular to local area networks and in order to allow the continued use of such software and to enable existing users of local area networks to continue their use of a mode of communication which is highly convenient, yet provide the advantages of asynchronous transfer mode, it is desirable to provide a service or mode of operation in which, among other aspects, end systems such as work-stations, servers, bridges etc can be connected to an asynchronous transfer mode network while the software which the local area network uses acts as if it were used in an ordinary local area network. In other words the asynchronous transfer mode system is transparent to the users of the local area network or networks to which it is connected.

In some circumstances it may be necessary or desirable to define a multiplicity of distinct domains within a single network. This leads to the concept of an emulated local area network, which comprises a group of asynchronous transfer mode devices but is analogous to a group of local area network stations connected to a segment of a local area network, which may in general be either cdma or token ring.

Each emulated local area network is composed of a set of 'local area network emulation clients', each of which may be part of an asynchronous transfer mode end station, and a single local area network emulation service.

A local area network emulation client is the entity which performs data forwarding, address resolution and other control functions. A local area network emulation server needs to provide a facility for resolving addresses expressed in terms of local area network addresses (and called herein media access control addresses) and route descriptors to asynchronous transfer mode channel numbers.

The interface shown in FIG. 1 performs several basic operations. First is the establishment of a particular virtual channel for the transmission of data between clients of an emulated local area network. Additionally it provides a means for a data packets to be 'broadcast' to all the members of an emulated local area network. Further, it will handle the temporary storage, in the host memory, of data packets which are to be transmitted, whether in unicast, multicast or broadcast mode, before and during the transmission of the data packets over the asynchronous transfer mode network. As will become apparent, it also provides a means for the transmission of multi-cast messages on channels other than channels used (as explained later) for messages which have no specific or known destination. It has a facility for restricting the usage of asynchronous transfer mode channels.

When a data packet from a particular 'client' is first received by the interface, no particular virtual channel will have been allotted to it. If the packet is to be broadcast to all the members of an emulated local area network, it will be transmitted over a virtual channel which is prescribed for broadcast transmission. Such a channel is termed herein a 'broadcast and unknown server', and more conveniently by the acronym BUS. In essence, the BUS handles data sent by a 'local area network emulation client' to a 'broadcast' media access control address. This address is used for multicast messages and initial unicast messages (i.e. messages intended for a multiplicity of destinations and a single destination respectively). In the latter case it is important to use the BUS to send over the emulated local area network the message to all possible destinations to enable the address of the message to be resolved, i.e. allotted to a specific virtual circuit channel.

When therefore a 'client' has data (normally in the form of a packet) to send and the asynchronous transfer mode address for the destination specified in the packet (the media access control address) is unknown, the 'client' needs to request an address resolution protocol (ARP). Once an emulation client provides a reply to the request for address resolution, a point to point virtual channel connection can be established so that the established virtual channel connection is used to send all subsequent data to that destination from the original 'client'.

For the transfer of data packets from a local area network coupled to the data bus, the ASIC 13 performs a look-up to determine the parameters, and identification numbers, of the respective emulated local area network and the appropriate parameters of the asynchronous access mode. As further explained hereinafter, it will provide support for address resolution protocol using the content addressable memory. It will allow the processor to build data packets in memory buffers in the host memory and allow these buffers to be added to the transmit segmentation queues for transmission on respective virtual channels.

The Content Addressable Memory

Figure 2:
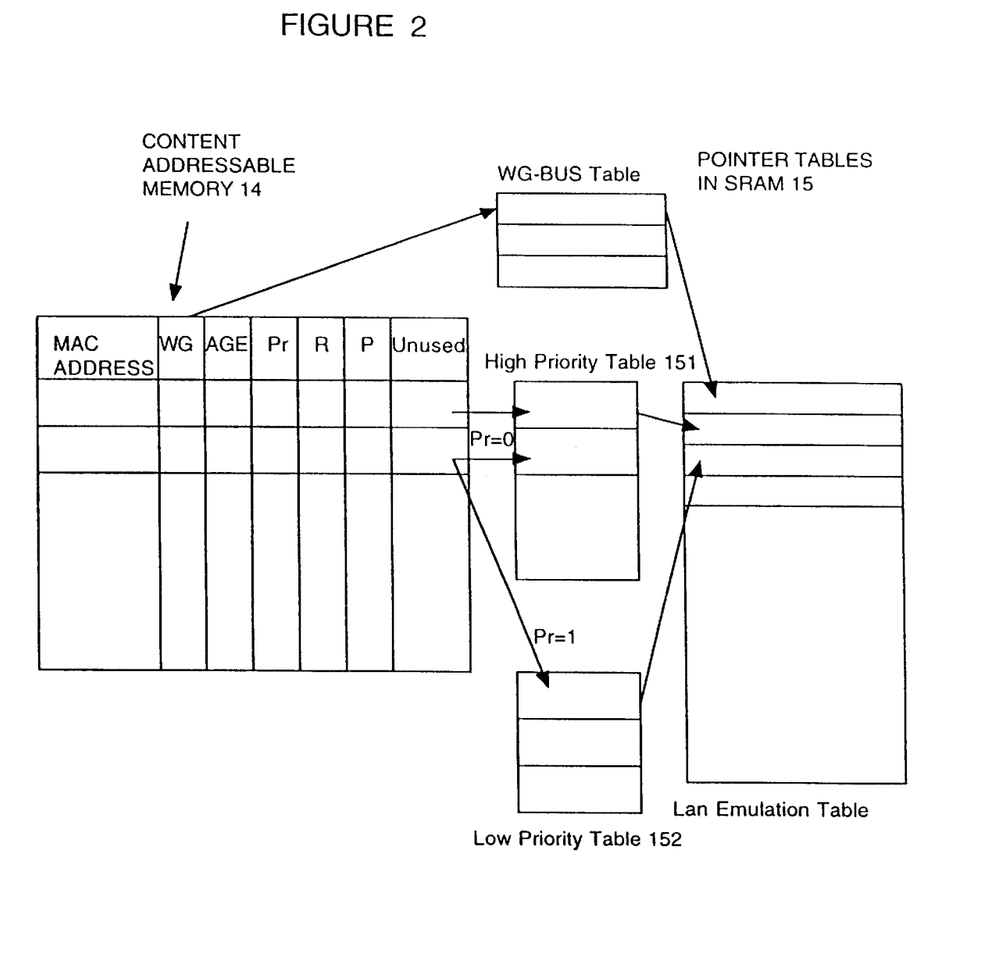
FIG. 2 is an illustration of the organisation of a content-addressable memory.

The contents addressable memory is a convenient form of an address look-up data base. One example suitable for use in the present system is an MU9C1480, produced by MUSIC Semiconductors. The memory may be extended by, for example, cascading memories or adding an external state machine to perform look-up. As will be seen, the present system extends the content addressable memory by means of the static random access memory 15.

The content addressable memory 14 and its associated static random access memory 15 provide several important features of the interfacing system and it is convenient to review them before the details of data transfer are described. These features are (i) the use of the content addressable memory for supporting unknown address; (ii) the extension of the content addressable memory by means of pointers based on priority; (iii) the handling of multi-media traffic which is unsuitable for transmission over a dedicated BUS channel.

FIG. 2 illustrates the organisation of the content addressable memory 14 and the associated pointer tables which are maintained in the static random access memory 15.

Each entry in the content addressable memory comprises the following:

There is an address field (media access control address) into which the media access control address of an ethernet packet (in this example a 48-bit address) is written when a packet having that address is first received from the data bus 11. It may in some cases be convenient to pre-load the memory with some addresses.

If the packet is a token ring packet, it may be given a pseudo-address which for example may comprise three four-bit fields defining the next three local area network numbers, a four-bit field identifying the next bridge number, and thirty two bits of padding.

The next field WG is a field (in this example four bits) defining a work group. This, together with a priority field P (in this example a one-bit field) define the channel number of the BUS allotted to the emulated local area network to which the 'client' belongs and on which all broadcast messages for that emulated local area network will be transmitted. The thus defined BUS channel is also the channel on which all unicast messages for a currently unknown address will be transmitted until a virtual channel connection channel has been established by an address resolution protocol between the source client and the specific destination.

The age field (in this example six bits) serves two purposes. First, it indicates whether a request for an address resolution is pending and it also indicates the age of the current entry.

Pointer Tables

The static random access memory contains pointer tables from which the virtual circuit channel number is derived. There is a pointer table for each level of priority so that for each mac address in the content addressable memory there is a pointer in each of the pointer tables 151 and 152. Each pointer defines a respective channel number. However, it is feasible to use a pointer in the table 152 to point to the same channel as the pointer in the table 151.

The pointer tables enable the ASIC 13 to direct packets into memory buffers ready for transmission on the appropriate virtual channel.

Thus, if there is a match between the destination address of the packet and an entry in the content addressable memory, the address of the matching location is read from the content addressable memory and along with the data bus priority bit, or in the case of a token ring this bit or a priority bit contained in a pseudo header, is used as an index into the respective pointer table in the static random access memory. In turn, the pointer table provides a pointer to an entry in the lan emulation table also stored in the static random access memory. This local area network emulation table provides a local area network emulation client identifier for the packet, a transmit segmentation ring number and some header information for the asynchronous transfer mode.

Unknown Addresses

If no match is detected for a unicast packet and the content addressable memory is not full, the destination address, work group and data bus priority bit will be written into the next free location in the content addressable memory. The age field will be written with a particular value to indicate that an ARP is pending for that media access control address. The entry will be marked as 'permanent'. The address of the location will be read from the content addressable memory and used to access the pointer table.

The processor will have previously set up the pointer table entry. The value of that entry is written onto the table on initialisation and each time a media access control address is deleted because it is too old or for any other reason. When the asic reads the value, it knows that it should send the packet to the BUS because the media access control address is currently being the subject of an ARP. The relevant status bit in a register will be set indicating that an unknown destination address has been detected. If no match is detected for a unicast packet and the content addressable memory is full, the packet must be discarded.

It when it reads the pointer table, the asic 13 detects a value that indicates an ARP pending, and the system is in a mode that allows it, the asic 13 will decrement the special value called herein C10 that forms part of the pointer table entry (e.g. the last four bits). The work group and priority bits are used to access the work group BUS table as before and thereby find the BUS channel for transmission of the packet.

If when it reads the pointer table the asic 13 detects a value that indicates an ARP is pending and the C10 value has been decremented to zero, indicating that the relevant number packets have already been sent to the BUS, the packet will be discarded.

The processor can search the content addressable memory for all packets requiring address resolution by searching the content addressable memory using the age field. When it finds a packet requiring address resolution, the processor can set an 'ARP-seen' bit. Further searches of the content addressable memory with the age field set as described will not reveal those entries. For local area network emulation the processor must regularly search the content addressable memory for all ARP pending media access control addresses and by reading the location of the media access control addresses in the content addressable memory, access the pointer table for that address and reload the C10 value if it has decremented to zero. The processor uses this scheme to guarantee that not more than a specific number of packets are sent to the BUS in a specific time period (between reloads of the C10 value) while an ARP is pending.

Use of Non-Bus Channels for Multi-Media Traffic

Since a BUS channel is used for broadcast and multicast traffic and is used to transmit all packets with new addresses which are unknown, i.e. do not yet have assigned to them specific virtual channel numbers, the throughput on a given bus channel can be high.

The network needs to be capable of handling multi-media traffic, which in general may include data from a broadband source such as television. Typically, data packets from such a source must be transmitted over a communication channel which has a constant latency, i.e. the transmission time through the channel should be constant. However, the latency of a BUS channel in asynchronous transfer mode will not be defined or constant and the traffic will very depending on the detection of new addresses and the incidence of multicast transmissions.

A solution is to define for a particular class of traffic a 'multicast' address in the content addressable memory, and to associate a particular virtual channel with it. Thus, if a thus defined multicast packet is received, the interface will, as explained hereinafter, search the content addressable memory for the destination address. If the packet is an ordinary multicast packet the destination address will not be located in the content addressable memory and the packet will be directed to a BUS channel. If the address is in the content addressable memory it will be defined as a multicast address and will be associated with a pointer which directs packets to a virtual channel connection which is not a dedicated BUS channel.

As part of the look-up process, a count of all the transmit buffers currently in use by the segmentation and reassembly unit for a particular virtual channel is returned to a host memory transmit control (within the asic 13) along with a programmable threshold value as is described later. The host memory transmit control evaluates these parameters to check that the current packet can be transmitted. Also returned as part of the look-up process is a transmit segmentation queue number that is to be used to transmit the packet.

If a packet is to be transmitted, the host memory transmit control will take the data from the internal random access memory and write it into data buffers in the dynamic random access memory. The host memory transmit control is responsible for fetching free buffers from a queue using a pointer dQStP as described later and filling the corresponding data buffers with the data to be transmitted, including adding header bytes as necessary.

Figure 4:
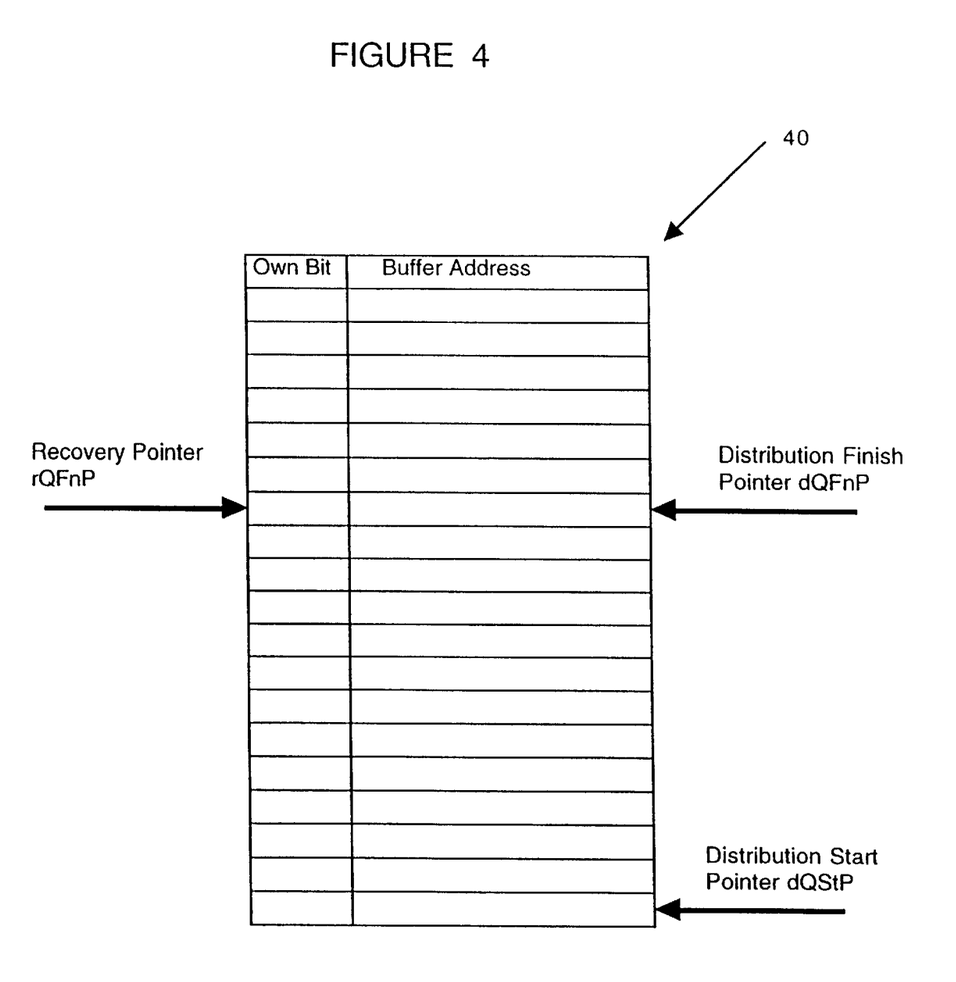
FIG. 4 is a diagram showing the organisation of a queuing system for memory buffers in the apparatus shown in FIG. 1.

The host memory transmit control within the asic 13 will check the transmit free buffer count before transmitting a frame. This count is evaluated by the control by a comparison of finish and start pointers dQFnP and dQStP (FIG. 4). If there are not enough free buffers, the frame will be discarded.

When the host memory transmit control has finished moving the data and descriptive information to the buffers in the dynamic random access memory for a particular frame, it will check the status of the transmit segmentation ring on which the frame should be transmitted. The information concerning which segmentation ring to use has been returned as part of the look-up process. If the segmentation ring is full, the frame will be discarded. If there is space available on the ring, indicating by checking the 'own bit' for zero, the host memory transmit control will add an entry to the ring. It does this by writing the pointer of the first buffer to the segmentation ring as well as setting the own bit to one. Further, it will increment the count of transmission buffers for the respective virtual channel. The free buffer count, represented by the difference between dQFnP and dQStP (FIG. 4) is automatically decremented.

The host memory control will assert various dynamic random access control signals that control writing of data into the dynamic random access memory and the reading of data from it for accesses from both the interface and the segmentation and reassembly unit. The host memory control also generates the dynamic random access memory address, handling row and column address switching, and the refreshing of the memory.

As indicated above, the host memory transmit control adds the first buffer pointer of a frame to an appropriate transmit segmentation queue. It also writes the transmit segmentation ring number to the transmit queue register in the segmentation and reassembly unit.

The central processing unit must also add entries into the transmit segmentation queues and it also has to write to the transmit queue register in the segmentation and reassembly unit. This unit, on finding these entries on the segmentation queues, will transmit the data. It then returns, namely surrenders control, of the buffers and indicates their return in the transmit completion queue by writing the buffer pointer and the own bit to a zero on the completion queue.

Host Memory Transmit Segmentation Ring Structure

The segmentation and reassembly unit allows, typically, up to two thousand different transmit 'packet segmentation rings' in the host memory. Each ring may take one of four values, typically sixteen, thirty-two, sixty-four and two hundred and fifty-six. The host memory reserves a long word block and stores the list of current finish and head pointers for the transmit segmentation rings. As part of the transmit look-up process, the host memory transmit control is given the segmentation ring number. This number is used as an offset for a base pointer to point to a particular segmentation finish pointer. The long word address for the dynamic random access memory to a particular segmentation pointer is generated from the transmit segmentation pointer and the transmit segmentation number.

The SAR 21 returns buffers to the queue 40 (FIG. 4) using a recovery pointer rQFnP and clears the 'own' bit.

Transmit Free Pool Controller

The asic includes a control function, described herein as the transmit free pool controller, which is required to perform two tasks. First, it has to manage the return of available buffers once they have been used by the segmentation and reassembly unit. It will by means of the poiner dQFnP monitor an integrated distribution and recovery queue 40 and if the 'own' bit is clear it will set the 'own' bit so that the buffer can be reused by the host memory transmit control. Second, the free pool controller decrements for each virtual channel, the number of transmit buffers currently waiting for their data to be transmitted by the segmentation and reassembly unit.

Channel Thresholds

Preferably the static random access memory is used to maintain for each virtual channel a count of the number of buffers in the dynamic random access memory having data packets for transmission on that channel. Also, there is maintained in static random access memory a count of the total number of buffers which have not been returned to the free pool and are therefore not yet available for use in sending new packets.

Figure 3:
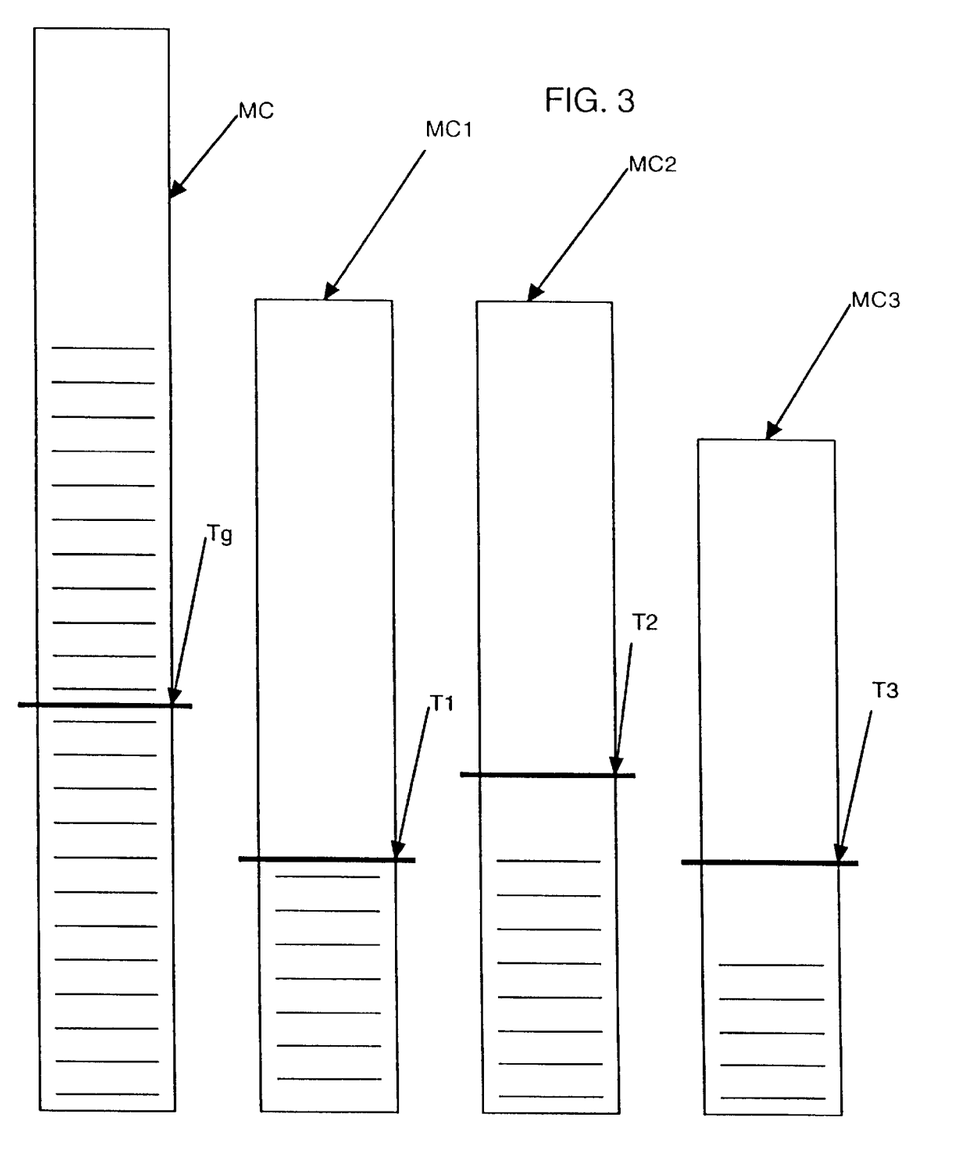
FIG. 3 is a diagram explaining the management of buffers in the system of FIG. 1.

FIG. 3 represents the counter which maintains the 'global' count as the counter MC. This contains a number N. The other counters (three in this simple example) contain counts N1, N2 and N3 respectively. Each of these counts represents the buffers currently used for the transmission of data for the respective virtual channel and not yet returned to the free pool. Every time a buffer is returned to the free pool the respective channel count and the global count is decremented accordingly.

If the total number of buffers in use (i.e. not available for storing fresh packets) is below a threshold limit, denoted Tg in FIG. 3, no action is required. This limit may be programmable. However, if the global limit is exceeded, the limits for each channel become operative. Thus if the limit T1 is exceeded for channel 1, then either any new data packet intended for that channel may be discarded (and possibly recovered later by retransmission) or some data flow control should be enabled to retard or stop the flow of packets from the relevant source until the number of buffers outstanding (not yet returned to the free pool) is less than the respective limit.

It is possible to operate more than one threshold per channel; for example, the use of buffers by a channel for which the buffer threshold has been exceeded may be stopped until the number of outstanding buffers is less than the limit by some programmable margin.

This feature is useful to counter the danger that for example a heavily loaded but comparatively slow channel uses too many buffers and that other channels, particularly normal fast channels become starved of buffers for their traffic. The feature allows a programmable limit on the number of queued buffers per channel.

The individual channel limits may be selected on the basis of a variety of criteria, for example channel usage, priority, multi-media usage and so on.

The technique can in practice be employed for virtually no cost. Typically an asynchronous transfer mode system must cater for thousands of virtual channels and must in practice contain (such as in the static random access memory) information pertaining to each channel. Such information may include a channel number, an identification number of the 'local area network emulation client', the channel priority and so on. Adding an up-down count function and a threshold value is not particularly costly in terms of software or hardware.

Integrated Queuing System

Another feature of the system of control of the memory buffers is the integrating of a recovery queue and a buffer distribution queue into one single queue space and optimising the pointers to control these two integrated queues. In a system where free buffers are taken from a buffer distribution queue by various devices, for example the host memory control and the central processing unit, the buffers, when used, are typically returned to a buffer recovery queue in a random order. The buffer recovery queue is monitored by a central resource and the buffers are moved from this queue to the free buffer distribution queue for reuse by the devices. Such scheme typically uses two pointers (say start and finish pointers) to control each queue. The buffer recovery queue has to be at least the size of the buffer distribution queue to guarantee that the devices can return the used buffers to the buffer recovery queue when they have finished using the buffers. By integrating both queues into one queue, the space required is only that of a buffer distribution queue. The pointers are more efficient, in that by incorporating the own bit; only one pointer is used by the buffer recovery queue. The issue of the size of the buffer distribution queue is also removed as the buffer recovery queue is overlaid on the buffer distribution queue. This guarantees that there is always space for used buffers to be returned to the buffer recovery queue. FIG. 4 is a table representing a queue 40 of buffer locations and pointers to them.

This queue, as indicated earlier, is an integrated distribution and recovery queue which works as follows: initially a special bit, herein called 'own bit' of all buffer locations in the queue are set to 1. The free buffer list is entered in the queue between dQFnP and dQStP. The rQFnP pointer is initialised to the same place as dQFnP. Free buffers are taken by the devices using the dQStP pointer (provided dQFnP-dQStP>0). Used buffers are returned by the devices at rQFnP, clearing the own bit as well. A separate process detects these returned buffers by observing the own bit=0 at dQFnP. The own bit is set to a one, allowing the free buffer to be reused. The size of the integrated queue can be fixed to one value, allowing the maximum number of free buffers required for all situations to be accommodated on the queue. Any number of free buffers less than this maximum number can be used, by programming the initial buffer pointers up to the value of dQFnP. This simplifies any fifo pointer roll-over mechanism, because the queue is a standard size. The difference between the dQFnP and dQStP pointers at any time is the number of free buffers available.

It will be understood that the foregoing is given by way of example only and that a variety of modifications may be made within the spirit and scope of the claims that follow.

We claim:

1. A system for transmitting over virtual channels, in an asynchronous transfer mode, data received in the form of data packets each of which data packets includes a respective destination address, said system also emulating the operation of a plurality of emulated local area networks and comprising:

an address look-up database containing entries accessible in responsible to the respective destination address of a data packet;

means for providing data defining for each of said data packets a respective one of a plurality of levels of priority; random access memory for maintaining a plurality of pointer tables, one for each of said plurality of levels or priority;

wherein each of said entries in said data base is associated with a plurality of pointers, one in each of said pointer tables, each of said pointers in said pointer tables indicating a virtual channel in said asynchronous transfer mode for the transmission of data packets having the respective destination address and the respective one of said levels of priority.

2. A system as in claim 1 wherein said random access memory comprises a static random access memory.

3. A system as in claim 1 wherein there are two levels of priority, the said respective one of said levels being indicated by a field in said database.

4. A method for transmitting over virtual channels, in an asynchronous transfer mode, data received in the form of data packets which include destination addresses, said method also emulating the operation of a plurality of emulated local area networks Comprising; and storing in a database the destination addresses of packets;

providing data for each of said data packets defining one of a plurality of levels of priority;

maintaining a plurality of pointer tables, one for each of said levels of priority;

wherein each destination address in said database is associated with a plurality of pointers, one in each of said pointer tables, each of said pointers in said pointer tables indicating a virtual channel for the transmission of a data packet having the respective destination address and the respective one of said levels of priority.

5. A method as in claim 4 wherein said tables are maintained in a random access memory.

6. A method as in claim 5 wherein there are two levels of priority, indicated by a one-bit field in said database.

* * * * *

UNITED STATES PATENT AND TRADEMARK OFFICE
CERTIFICATE OF CORRECTION

PATENT NO.    : 6,163,541
DATED         : December 19, 2000
INVENTOR(S)   : O'CONNELL et al

It is certified that error appears in the above-identified patent and that said letters patent is hereby corrected as shown below:

Column 2, line 7, change "Address" to --address--.

Column 10, line 66, change "Comprising; and" to --and comprising:--.

Signed and Sealed this

Fifteenth Day of May, 2001

*Attest:*

NICHOLAS P. GODICI

*Attesting Officer*    *Acting Director of the United States Patent and Trademark Office*